(12) United States Patent
Xu et al.

(10) Patent No.: US 9,363,398 B2
(45) Date of Patent: Jun. 7, 2016

(54) INTERLOCKING ASSEMBLY FOR A SCANNING UNIT

(71) Applicant: HEWLETT-PACKARD DEVELOPMENT COMPANY, L.P., Houston, TX (US)

(72) Inventors: De-Ming Xu, Singapore (SG); Xiao-Hua Zhou, Shanghai (CN); Song Zhang, Shanghai (CN)

(73) Assignee: HEWLETT PACKARD DEVELOPMENT COMPANY, L.P., Houston, TX (US)

( * ) Notice: Subject to any disclaimer, the term of this patent is extended or adjusted under 35 U.S.C. 154(b) by 0 days.

(21) Appl. No.: 14/649,199

(22) PCT Filed: Jan. 21, 2013

(86) PCT No.: PCT/CN2013/070762
§ 371 (c)(1),
(2) Date: Jun. 2, 2015

(87) PCT Pub. No.: WO2014/110824
PCT Pub. Date: Jul. 24, 2014

(65) Prior Publication Data
US 2015/0319323 A1 Nov. 5, 2015

(51) Int. Cl.
*H04N 1/04* (2006.01)
*H04N 1/00* (2006.01)
(Continued)

(52) U.S. Cl.
CPC ......... *H04N 1/00599* (2013.01); *H04N 1/0057* (2013.01); *H04N 1/00567* (2013.01);
(Continued)

(58) Field of Classification Search
CPC ............ H04N 1/00567; H04N 1/0057; H04N 1/00599; H04N 1/024; H04N 1/31; H04N 2201/0081; Y10T 74/19637; Y10T 74/20654
USPC .......... 358/498, 474, 497, 496; 74/411.5, 530
See application file for complete search history.

(56) References Cited

U.S. PATENT DOCUMENTS 2,503,060 A * 4/1950 Miller .................... G01S 13/422
315/380
5,870,317 A * 2/1999 Barnett .............. G05B 23/0256
307/115
(Continued)

FOREIGN PATENT DOCUMENTS

| CN | 102193374 A | 9/2011 |
| EP | 2166180 A2 | 3/2010 |
| JP | 5876860 | 5/1983 |

OTHER PUBLICATIONS

International Searching Authority. ISA/CN. International Search Report. Date of Mailing Oct. 31, 2013. Application No. PCT/CN2013/070762. Filing date Jan. 21, 2013.

*Primary Examiner* — Negussie Worku
(74) *Attorney, Agent, or Firm* — HP Inc.—Patent Department

(57) ABSTRACT

The disclosure relates to a scantling unit (20) comprising an interlocking assembly (45). The interlocking assembly (45) comprises; an interlock arm (40) pivotably connected to a scanner base of the scanning unit (20) and movable between a locked position and an unlocked position; and a biasing mechanism, for biasing the interlock arm toward the locked position, A combo gear (31) of the scanning unit (20) is locked by the interlocking assembly (45), thereby being prevented from, rotating, before a scan bar driver gear (26) of the scanning unit (20) engages with the combo gear (31) of the scanning unit (20).

16 Claims, 6 Drawing Sheets

(51) Int. Cl.
*H04N 1/024* (2006.01)
*H04N 1/31* (2006.01)

(52) U.S. Cl.
CPC ............... *H04N1/024* (2013.01); *H04N 1/31* (2013.01); *H04N 2201/0081* (2013.01); *Y10T 74/19637* (2015.01); *Y10T 74/20654* (2015.01)

(56) References Cited

U.S. PATENT DOCUMENTS

| | | | | |
|---|---|---|---|---|
| 6,672,581 B2 * | 1/2004 | Lee | ............... | B65H 5/06 271/10.13 |
| 7,461,840 B2 * | 12/2008 | Hattori | ............... | B65H 1/14 271/110 |
| 7,540,491 B2 * | 6/2009 | Sherman | ............... | B65H 3/0669 192/215 |
| 7,571,905 B2 | 8/2009 | Kim | | |
| 8,219,012 B2 | 7/2012 | Embry et al. | | |
| 8,276,906 B2 * | 10/2012 | Yamamoto | ............... | B65H 3/0607 271/127 |
| 8,439,448 B2 * | 5/2013 | Murthy | ............... | B60N 2/065 297/468 |
| 8,870,180 B2 * | 10/2014 | Le | ............... | B65H 9/002 271/114 |
| 9,046,844 B2 * | 6/2015 | Hashimoto | ............... | G03G 15/234 |
| 9,056,721 B2 * | 6/2015 | Minemura | ............... | B65G 13/073 |
| 9,079,748 B2 * | 7/2015 | Tracey | ............... | A01G 25/16 |
| 2005/0094217 A1 | 5/2005 | Molchan et al. | | |
| 2006/0061832 A1 | 3/2006 | Ferguson et al. | | |
| 2010/0328736 A1 | 12/2010 | Ozawa | | |
| 2011/0148034 A1 | 6/2011 | Inoue | | |
| 2011/0182614 A1 * | 7/2011 | Onuma | ............... | G03G 21/1633 399/110 |
| 2011/0200375 A1 | 8/2011 | Kokawa et al. | | |

\* cited by examiner

INTERLOCKING ASSEMBLY FOR A SCANNING UNIT

BACKGROUND

Generally, an image forming apparatus receives an image signal and transfers the image signal onto a sheet of paper to form a visible image. In particular, an image forming apparatus having a scanning function, such as a facsimile or a scanner, scans an image recorded on a document, converts the image into digital image information, which may be reproduced on a sheet of paper or a display. The image forming apparatus with the scanning function includes a scanning unit scanning an image cm a document and an automatic document feeding (ADF) unit feeding each page of the document to the scanning unit.

DESCRIPTION OF DRAWINGS

Examples of the present disclosure are described in the following description with reference to the figures. In the figures, identical and similar structures, elements or parts thereof are labeled with the same or similar references. Referring to the attached figures.

DETAILED DESCRIPTION

Figure 1:
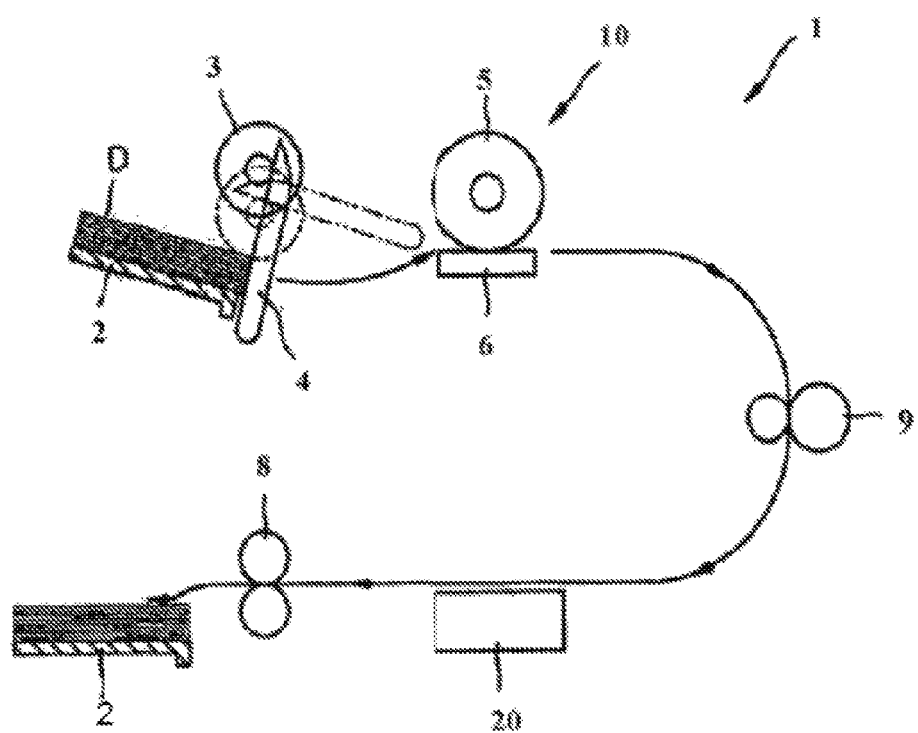
FIG. 1 is a schematic view of a portion of an image forming apparatus according to an example of the present disclosure.

As used herein, directional terms, such as "up", "down", "front", "rear", "leading", "trailing" "transverse" etc., are used with reference to the orientation of the figures being described. Because components of various examples disclosed herein can be positioned in a number of different orientations, the directional terminology is used for illustrative purposes only, and is not intended to be limiting. It is also to be understood that the examples illustrated in the drawings, and the specific language used herein to describe the same are not intended to limit the scope of the disclosure. Alterations and further modifications of the features illustrated herein, and additional applications of the principles illustrated herein are to be considered to fall within the scope of the disclosure.

The image forming apparatus with the scanning function includes a scanning unit scanning an image on a document and an automatic document feeding (ADF) unit feeding each page of the document to the scanning unit (the so-called "automatic document feeding" function).

In some existing examples, in order to ensure high scanning quality, the scan lens line of the scanning unit is aligned with a pressure bar center line of the ADF unit. During operation, however, the scan bar driver gear may slip due to a low ADF unit torque, which is also referred to as "scanning unit slippage", so that the scanning unit may not move to the calibration position, and the scan lens line is not aligned with the pressure bar center line of the ADF unit, thereby lowering the scanning quality.

In order to prevent the scanning unit slippage, in some existing examples, the resistance of the ADF unit is increased by adding damping oil or designing the driven members to be interference fit. However the damping grease will be used out before printer end of life, the parts will be wear out due to interference fit, thus reducing efficiency.

According to an example of the present disclosure, there is provided a scanning unit comprising an interlocking assembly, the interlocking assembly comprising: an interlock arm pivotably connected to a scanner base of the scanning unit and movable between a locked position and an unlocked position; and a biasing mechanism for biasing the interlock arm toward the locked position, wherein a combo gear of the scanning unit is locked by the interlocking assembly, thereby being prevented from rotating, before a scan bar driver gear of the scanning unit engages with the combo gear of the scanning unit.

According to an example of the present disclosure, the interlock arm includes a latch portion at one end thereof, the latch portion defines a serrated notch matching with tooth of the combo gear.

According to an example of the present disclosure, the interlock arm further includes as acuation portion at the other end thereof.

According to an example of the present disclosure, the actuation portion of the interlock arm includes an inclined surface and a protrusion extending upwardly from the interlock arm, the scanning unit further includes a plunger, the plunger moves along the inclined surface of the actuation portion, thereby actuating downwardly the interlock arm, when the scanner base moves to a calibration position where the scan bar driver gear engages with the combo gear, so that the interlock arm moves to the unlocked position.

According to an example of the present disclosure, the biasing mechanism is a torsion spring, which is fit over a post on the interlock arm at a first end thereof, and the second end thereof rests on a hump of the seamier base.

According to another example of the present disclosure, there is provided a scanning unit for an image forming apparatus, and an image forming apparatus.

Referring to FIG. 1, the image forming apparatus 1 having a scanning function includes a scanning unit 20 scanning images recorded on documents D and the ADF unit 10 feeding the documents D to the scanning unit 20.

The ADF unit 10 feeds the documents D to the scanning unit 20 one by one. Specifically, the ADF unit 10 includes; a document feeding tray 2 wherein a plurality of documents D to be scanned are stacked; a pickup roller 3 which rotates while in contact with an uppermost document D of the documents D and picks up one through several documents D; an ADF roller 5 which rotates while in contact with the picked-up documents D and feeding each of the picked-up documents D to the scanning unit 20: an ADF pad 6 attached to a bottom surface of the ADF roller 5; a feeding roller 9 for providing a transporting force to the documents D fed by the feeding roller 9; an exit roller 8 for exiting the documents D on which the images have been scanned by the scanning unit 20; and a document receiving tray 7 wherein the exited documents D are received and stacked.

The ADF unit 10 further includes the document stopper 4 blocking the documents D stacked on the document feeding tray 2 and limiting a movement of the documents D. The document stopper 4 is associated with the pickup roller 3. The document stopper 4 is locked when the pickup roller 3 is separated from the stacked documents D (as indicated in a solid line), thus limiting the movement of the documents D. In contrast, the document stopper 4 is unlocked when the pickup roller 3 descends (as indicated in a double-dashed line), thus rotating to feed the documents D.

Each of the documents D fed by the ADF unit 10 is transported to the scanning unit 20, and passed over the scanning unit 20. The scanning unit 20 scans the image recorded on a bottom surface of each document D that passes over it. The scanned documents D are fed to the document receiving tray 7 by the exit roller 8 and received and stacked on the document receiving tray 7.

The scanning unit 20 will be described in detail with reference to FIGS. 2-6. According to the illustrated example, the scanning unit 20 includes an optical scanner, such as a Contact Image Sensor (CIS).

Figure 2:
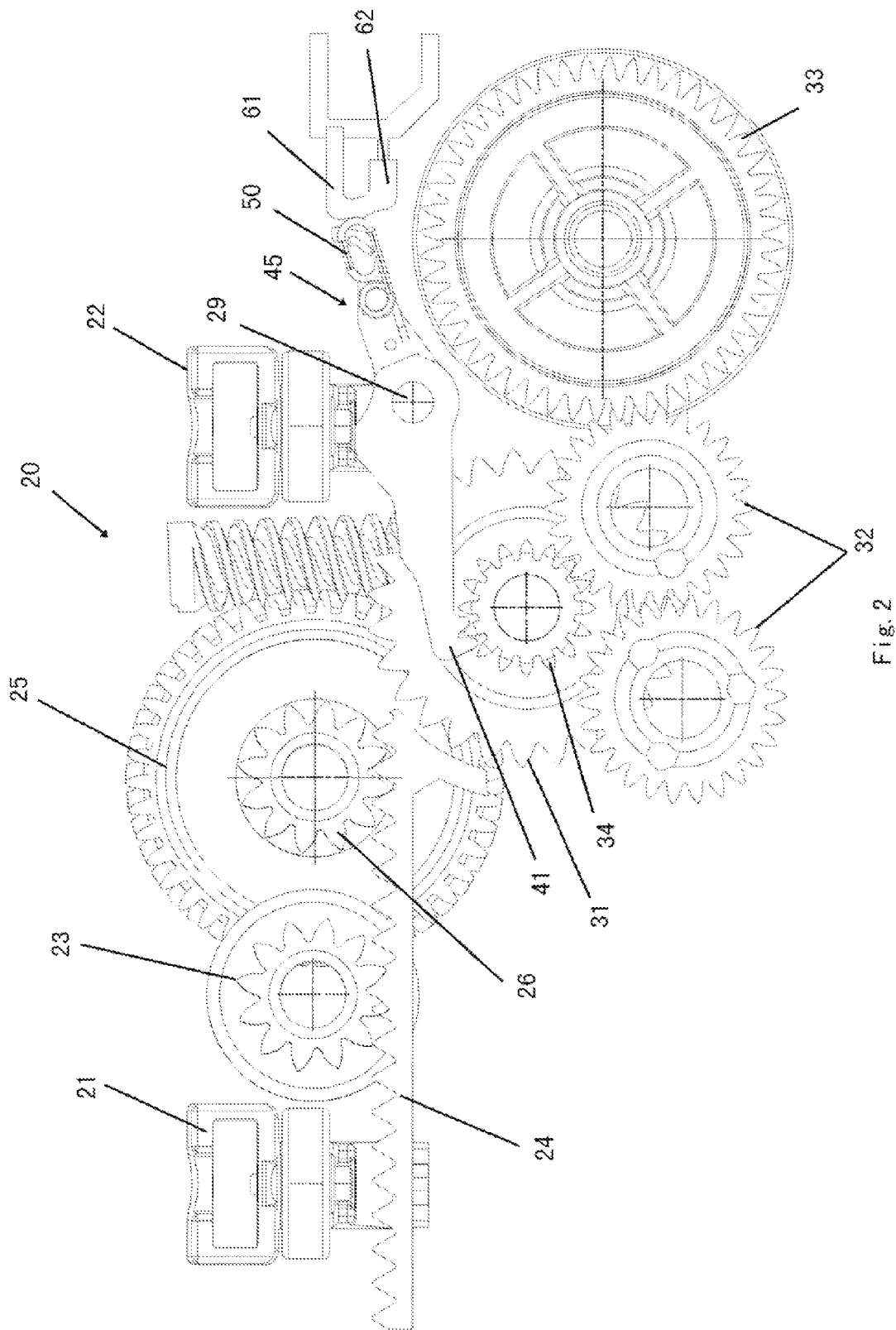
FIG. 2 is a front view of a scanning unit with an interlocking assembly having an interlock arm and a torsion spring according to an example of the present disclosure, wherein the interlock arm is in a locked position.
Figure 3:
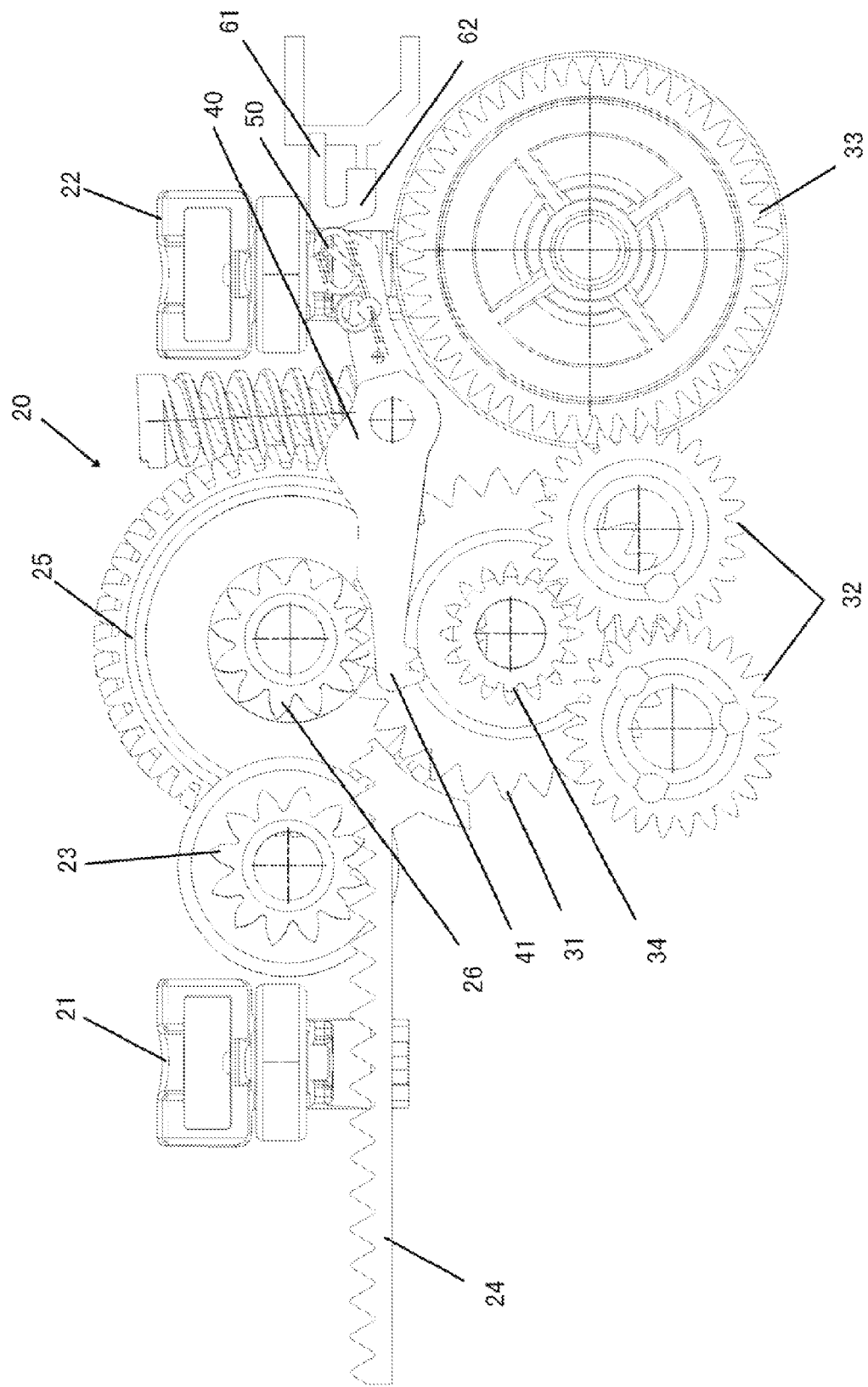
FIG. 3 is a front view of a scanning unit with an interlocking assembly having an interlock arm and a torsion spring according to an example of the present disclosure, wherein the interlock arm is in an unlocked position.

FIG. 2 is a front view of a scanning unit with an interlocking assembly 45 having an interlock arm 40 and a torsion spring 50 according to an example of the present disclosure, wherein the interlock arm 40 is in a locked position. FIG. 3 is a front view of a scanning unit with an interlocking assembly 45 having an interlock arm 40 and a torsion spring 50 according to an example of the present disclosure, wherein the interlock arm 40 is in an unlocked position.

The scanning unit 20 includes a scanner base (not shown in FIG. 2), a rear wheel plunger 21, a front wheel plunger 22, a driven gear 23, a scanner base rack 24, a scan bar driver gear 26, a combo gear 31, idler gears 32, a power output gear 33, and an interlocking assembly 45.

In an example, the interlocking assembly 45 includes an interlock arm 40 pivotably connected to the scanner base and movable between a locked position and an unlocked position; and a biasing mechanism for biasing the interlock arm toward the locked position. The combo gear 31 is locked, by the interlocking assembly 45, thereby being prevented from rotating, before the scan bar driver gear 26 engages with the combo gear 31.

In an example, the interlock, arm 40 includes a latch portion 41 at one end thereof, the latch, portion 41 defines a serrated notch matching with a tooth 34 of the combo gear 31. In an example, the interlock arm 40 further includes an actuation portion 42 at the other end thereof.

In an example, the actuation portion 42 of the interlock arm 40 includes an inclined surface 44 (shown in FIG. 6) which functions as an actuation surface, and a protrusion 46 (shown in FIG. 5) extending upwardly from the interlock arm and acting as a stopper. The scanning unit 20 further includes a plunger 22. The plunger 22 moves along the inclined surface 44 of the actuation portion 42, thereby pushing the interlock arm 40 downwards, when the scanner base moves to a calibration position where the scan bar driver gear 26 engages with the combo gear 31, so that the interlock arm 40 moves to the unlocked position. It is to be noted that, although the actuator of the interlock arm 40 is shown as the front wheel plunger 22 to the figures, the actuator of the interlock arm 40 may be for example the rear wheel plunger 21, without departing the scope of the disclosure.

In an example, the biasing mechanism is a torsion spring 50, which is fit over a post on the interlock arm 40 at a first end thereof, and the second end thereof rests on a hump 62 of a structure 61 on the scanner base. When the interlock arm 40 is located in the locked position, the second end of the torsion spring 50 rests on the upper surface of the hump 62, thereby maintaining the interlock arm 40 in the locked position. When the interlock arm 40 is located in the unlocked position, the second end of the torsion spring 50 still rests on the upper surface of the hump 62 and the first end of the torsion spring 50 moves downwardly with the interlock arm 40, thus applying a returning spring force. The interlock arm 40 is kept in the unlocked position by the balance between actuation force applied by the plunger 22 and the returning spring force of the torsion spring 50. Once the actuation force of the plunger 22 is removed, the returning spring force of the torsion spring 50 causes the interlock arm 40 to return to the locked position. It is to be noted that, although the biasing mechanism is shown as the torsion spring 50 in the figures, the biasing mechanism may be other types of biasing mechanism, without departing the scope of the disclosure.

In an example, the torsion spring 50 is made from stainless steel SUS 301, and the interlock arm 40 is made from Polyoxymethylene (POM) lubricated with 5% Polytetrafluoroethene (PTFE). It is to be noted that, the torsion spring 50 and the interlock arm 40 may be made from oilier suitable materials, without departing the scope of the disclosure.

In an example, the scanner base includes two stoppers (not shown) for limiting the locked position and the unlocked position.

In an example, the interlock arm 40 is connected to the scanner base via a pivot hinge. In an example, the pivot hinge is a boss 29 intergral with the scanner base. In another example, the pivot hinge can be separate from the scanner base.

Figure 4:
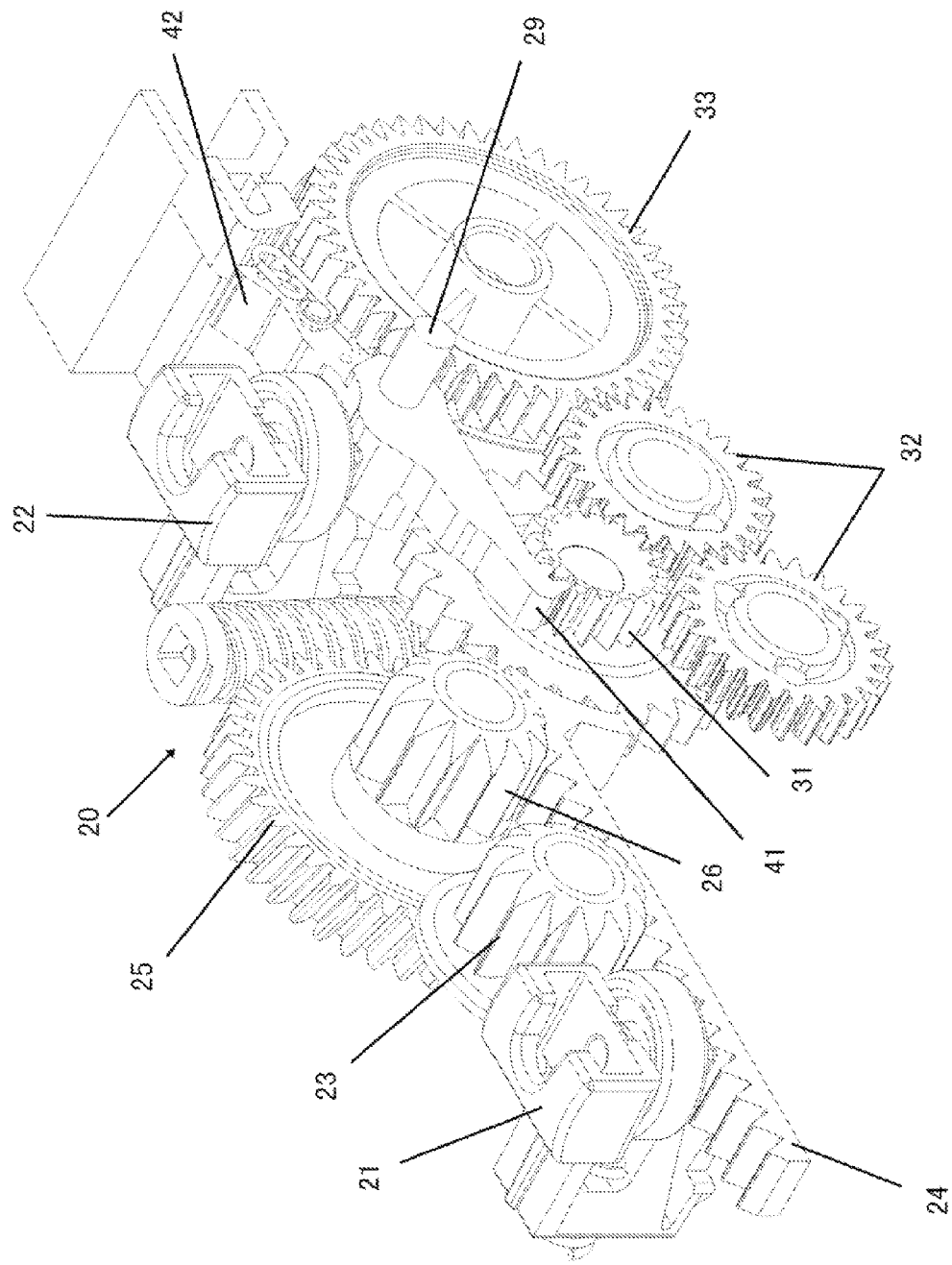
FIG. 4 is a perspective view of a scanning unit with an interlocking assembly having an interlock arm and a torsion spring according to an example of the present disclosure, wherein the interlock arm is in a locked position.
Figure 5:
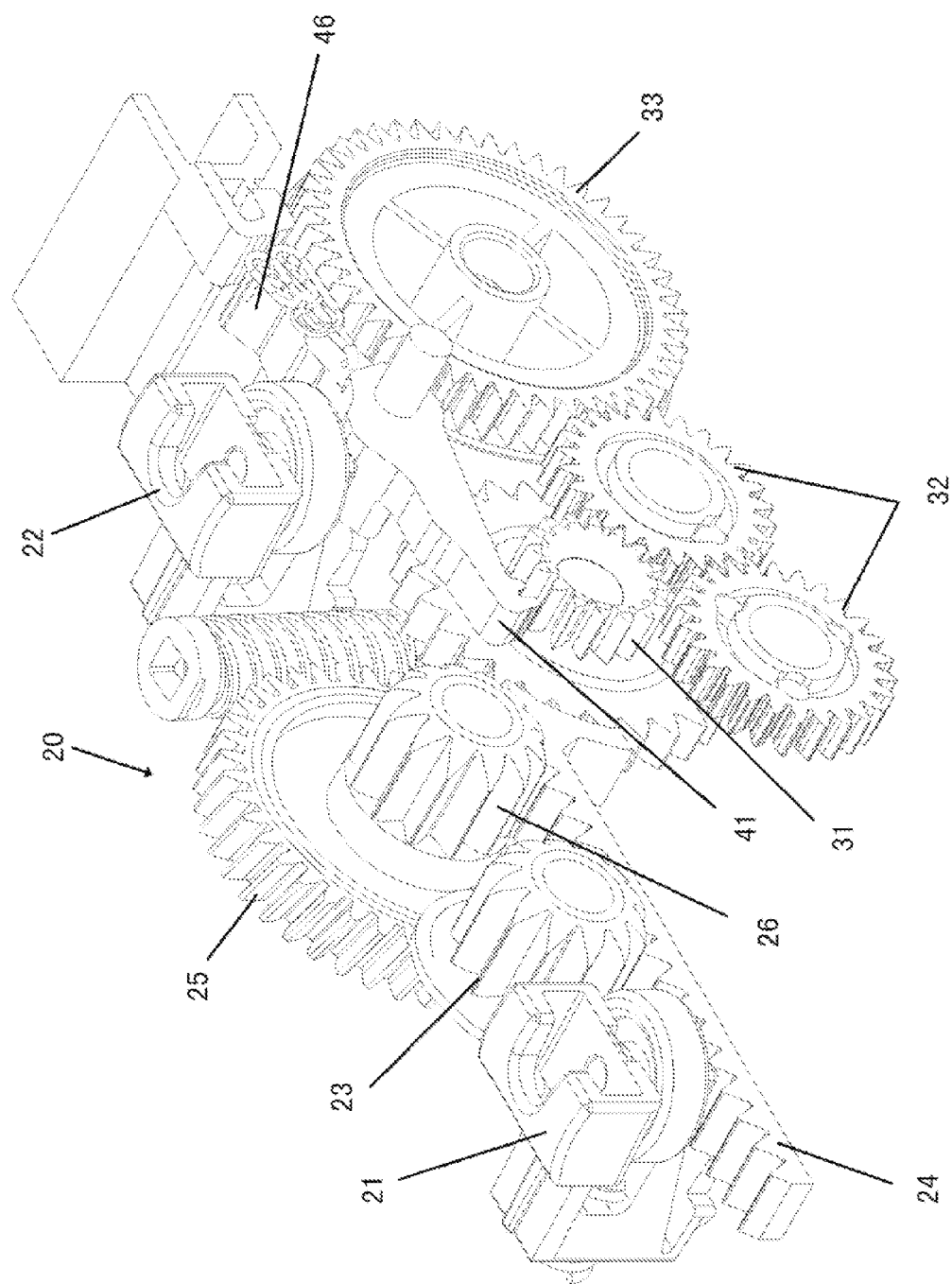
FIG. 5 is a perspective view of a scanning unit with an interlocking assembly having an interlock arm and a torsion spring according to an example of the present disclosure, wherein the interlock arm is in an unlocked position.

FIG. 4 is a perspective view of a scanning unit with an interlocking assembly 45 having an interlock arm 40 and a torsion spring 50 according to an example of the present disclosure, wherein the interlock arm: 40 is in a locked position. FIG. 5 is a perspective view of a scanning unit with an interlocking assembly 45 having an interlock arm 40 and a torsion spring 50 according to an example of the present disclosure, wherein the interlock arm 40 is in an unlocked position.

Figure 6:
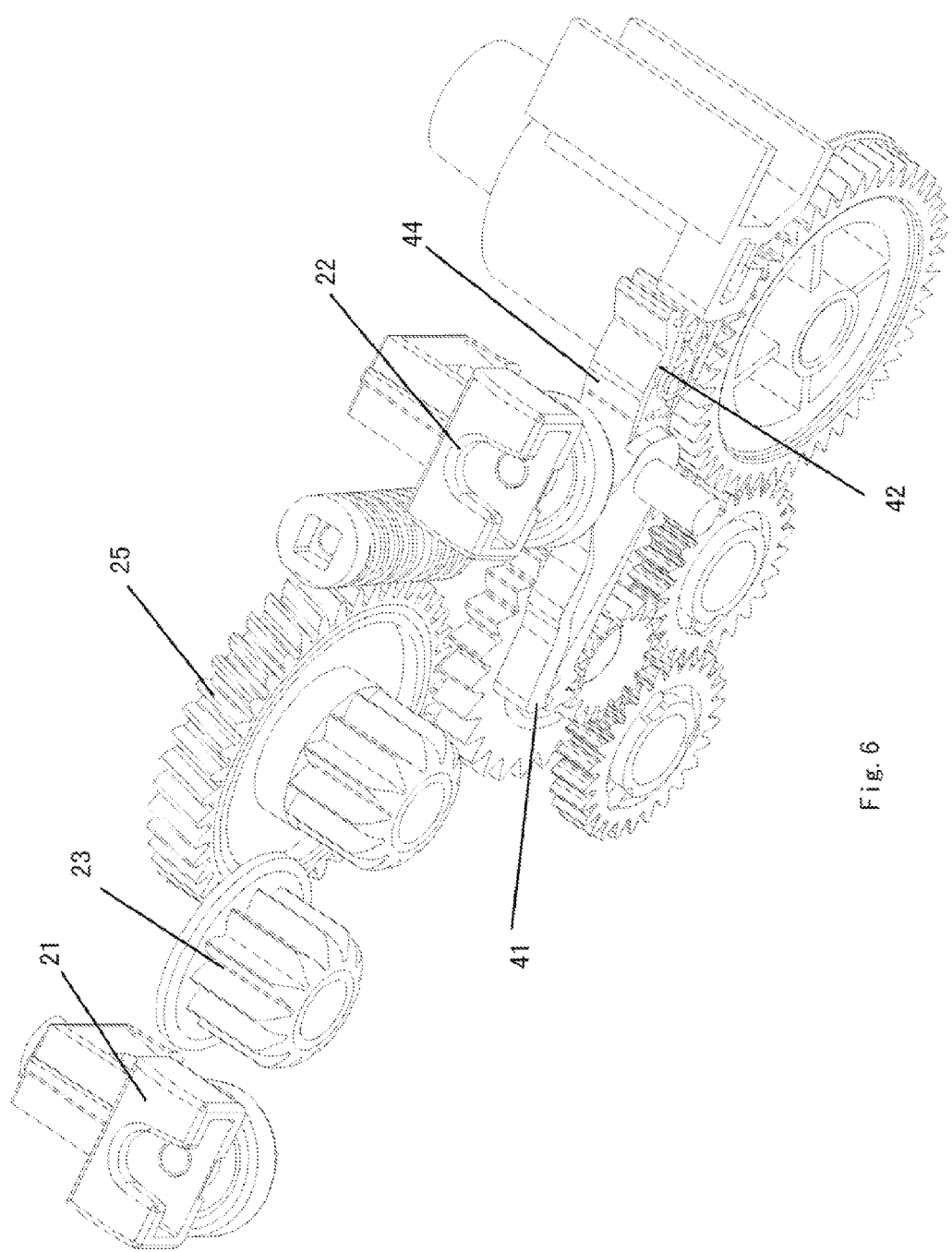
FIG. 6 is a right top perspective view of a scanning unit with an interlocking assembly having an interlock arm and a torsion spring according to an example of the present disclosure.

FIG. 6 is a right top perspective view of a scanning unit with an interlocking assembly 45 having an interlock arm 40 and a torsion spring 50 according to an example of the present disclosure.

Now, the operation of the interlocking assembly 45 having the interlock arm 40 and the torsion spring 50 according to an example of the present disclosure is described. Before the ADF unit 10 feeds the original paper through scanner lens, the interlock arm 40 is in locked default position, the second end of the torsion spring 50 rests on the upper surface of the hump 62, thereby maintaining the interlock arm 40 in the locked position. At the locked position, the serrated notch on the latch portion 41 of the interlock arm 40 engages with tooth 34 of the combo gear, thereby ensuring the scanner base can move to proper calibration position that avoids the scan image shift.

When a user starts the scanning unit 20, the scanning unit (include scan bar driver gear 26, drive motor, front wheel plunger 22, rear wheel plunger 21, etc.) will move to the calibration position where the scan bar driver gear 26 engages with the combo gear 31, so that the plunger 22 pushes the interlock arm 40 downwards so that the interlock arm 40 moves to the unlocked position against the spring force of the torsion spring 50. The second end of the torsion spring 50 still rests on the tipper surface of the hump 62 and the first end of the torsion spring 50 moves downwardly with the interlock arm 40, thus applying a returning spring force. The interlock arm 40 is kept in the unlocked position by the balance between actuation force applied by the plunger 22 and the returning spring force of the torsion spring 50. Once the interlock arm 40 moves to the unlock position, the ADF unit 10 starts to feed the original paper through scanner lens to perform ADF copy function. After the ADF copy function is completed, the actuation force of the plunger 22 is removed, so that the returning spring force of the torsion spring 50 causes the interlock arm 40 to return to the locked position.

Having described an example of the scanning unit of the present disclosure, and in particular the interlocking assembly by which the combo gear is locked before the scan bar driver gear engages with the combo gear, it should be apparent to those skilled in the art that the disclosure may be modified in both arrangement and detail.

Although specific examples have been illustrated and described herein, it will be appreciated by those of ordinary skill in the art that a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A scanning unit comprising an interlocking assembly, the interlocking assembly comprising:
   an interlock arm pivotably connected to a scanner base of the scanning unit and movable between a locked position and an unlocked position; and
   a biasing mechanism for biasing the interlock arm toward the locked position,
   wherein a combo gear of the scanning unit is locked by the interlocking assembly, thereby being prevented from rotating, before a scan bar driver gear of the scanning unit engages with the combo gear of the scanning unit.

2. The scanning unit of claim 1, wherein the interlock arm includes a latch portion, the latch portion defining a serrated notch matching with teeth of the combo gear.

3. The scanning unit of claim 2, wherein the interlock aim further includes an acuation portion.

4. The scanning unit of claim 3, wherein the actuation portion of the interlock arm includes an inclined surface and a protrusion extending upwardly from the interlock arm, the scanning unit farther includes a plunger, the plunger is to move along the inclined surface of the actuation portion, thereby actuating downwardly the interlock arm, when the scanner base moves to a calibration, position where the scan bar driver gear engages with the combo gear, so that the interlock arm moves to the unlocked position.

5. The scanning unit of claim 1, wherein the biasing mechanism is a torsion spring, which is fit over a post on the interlock arm at a first end thereof, and the second end thereof rests on a hump (62) of the scanner base.

6. The scanning unit of claim 5, wherein the torsion spring is made from stainless steel SUS 301.

7. The scanning unit of claim 1, wherein the scanner base includes two stoppers for limiting the locked position and the unlocked position.

8. The scanning unit of claim 1, wherein the interlock arm is made from Polyoxymethylene (POM) lubricated with 5% Polytetrafluoroethene (PTFE).

9. The scanning unit of claim 1, wherein the interlock arm is connected to the scanner base via a pivot hinge.

10. The scanning unit of claim 9, wherein the pivot hinge is a boss intergral with the scanner base.

11. A scanning unit for an image forming apparatus, comprising:
    a scanner base,
    a scan bar driver gear,
    a combo gear, and
    an interlocking assembly comprising:
       an interlock arm pivotably connected to the scanner base and movable between a locked position and an unlocked position; and
       a biasing mechanism, for biasing the interlock arm toward the locked position,
    wherein the combo gear is locked by the interlocking assembly, thereby being prevented from rotating, before the scan bar driver gear engages with the combo gear.

12. The scanning unit of claim 11 wherein the interlock arm includes a latch portion at one end thereof, the latch portion defines a serrated notch matching with tooth of the combo gear.

13. The scanning unit of claim 12, wherein the interlock arm further includes an actuation portion at the other end thereof.

14. The scanning unit of claim 13, wherein the actuation portion of the interlock arm includes an inclined surface and a protrusion extending upwardly from the interlock arm, the scanning unit further includes a plunger, the plunger moves along the inclined surface of the actuation portion, thereby actuating downwardly the interlock arm, when the scanner base moves to a calibration position where the scan bar driver gear engages with the combo gear, so that the interlock arm moves to the unlocked position.

15. The scanning unit of claim 14, wherein the biasing mechanism is a torsion spring, which is fit over a post on the interlock arm at a first end thereof, and the second end thereof rests on a hump of the scanner base.

16. An image forming apparatus comprising:
    a scanning unit scanning an image on a document; and
    an automatic document feeding unit feeding each page of the document to the scanning unit,
    wherein the scanning unit comprises:
       a scanner base,
       a scan bar driver gear,
       a combo gear, and
       an interlocking assembly comprising:
          an interlock arm pivotably connected to the scanner base and movable between a locked position and an unlocked position; and
          a biasing mechanism for biasing the interlock arm toward the locked position,
       wherein the combo gear is locked, by the interlocking assembly, thereby being prevented from rotating, before the scan bar driver gear engages with the combo gear.

* * * * *